US010607167B2

(12) United States Patent
Ristock et al.

(10) Patent No.: US 10,607,167 B2
(45) Date of Patent: Mar. 31, 2020

(54) SYSTEM AND METHOD FOR INTELLIGENT TASK MANAGEMENT AND ROUTING BASED ON PHYSIOLOGICAL SENSOR INPUT DATA

(71) Applicant: Genesys Telecommunications Laboratories, Inc., Daly City, CA (US)

(72) Inventors: Herbert Willi Artur Ristock, Walnut Creek, CA (US); Adrian Lee-Kwen, North York (CA); David Beilis, Toronto (CA); Christopher Connolly, New York, NY (US); Liyuan Qiao, Toronto (CA); Merijn te Booij, Burlingame, CA (US); James Kraeutler, Cardiff, CA (US)

( * ) Notice: Subject to any disclaimer, the term of this patent is extended or adjusted under 35 U.S.C. 154(b) by 1085 days.

(21) Appl. No.: 14/882,399

(22) Filed: Oct. 13, 2015

(65) Prior Publication Data

US 2017/0103360 A1   Apr. 13, 2017

(51) Int. Cl.
*G06Q 10/06* (2012.01)
*H04L 29/08* (2006.01)
*H04L 29/06* (2006.01)

(52) U.S. Cl.
CPC ........... *G06Q 10/063114* (2013.01); *G06Q 10/063112* (2013.01); *H04L 67/10* (2013.01); *H04L 67/12* (2013.01); *H04L 67/18* (2013.01); *H04L 67/20* (2013.01); *H04L 67/28* (2013.01); *H04L 67/32* (2013.01); *H04L 67/42* (2013.01)

(58) Field of Classification Search
USPC .................................................... 705/7.14
See application file for complete search history.

(56) References Cited

U.S. PATENT DOCUMENTS

| 6,151,571 | A  | * | 11/2000 | Pertrushin | ............... | G10L 17/26 704/207 |
| 6,450,820 | B1 | * | 9/2002 | Palsson | .................. | G09B 19/22 434/236 |
| 7,372,952 | B1 |   | 5/2008 | Wu et al. | | |
| 8,130,935 | B1 | * | 3/2012 | Coughlan | ........... | H04M 3/5232 379/265.02 |
| 8,306,213 | B1 |   | 11/2012 | Vasquez et al. | | |

(Continued)

OTHER PUBLICATIONS

Bernabe-Moreno et al, Emotional Profiling of Locations Based on Social Media, 3rd International Conference on Information Technology and Quantitative Management, ITQM 2015, available at https://doi.org/10.1016/j.procs.2015.07.107 (Year: 2015).*

(Continued)

*Primary Examiner* — Folashade Anderson

(57) ABSTRACT

Systems and methods are shown for routing task objects to multiple agents that involve receiving and storing real-time sensor data for multiple agents, receiving tasks and, for each task, create a task object representing the task and placing the task object in an input buffer. For each task object in the input buffer, utilize the real-time sensor data to identify one or more of the multiple agents as suitable for assignment to the task, apply a routing strategy to the task object to further select one of the multiple agents identified as suitable for assignment of the task object based on sensor data, and route the task object from the input buffer to a workbin corresponding to the selected agent.

28 Claims, 14 Drawing Sheets

(56) References Cited

U.S. PATENT DOCUMENTS

| | | |
|---|---|---|
| 8,406,155 B1 | 3/2013 | Vasquez et al. |
| 8,475,367 B1 | 7/2013 | Yuen et al. |
| 8,576,995 B1 | 11/2013 | Marghescu et al. |
| 8,582,475 B1 | 11/2013 | Marghescu et al. |
| 8,653,965 B1* | 2/2014 | Otto .................. G08B 21/0453 340/286.01 |
| 8,831,207 B1 | 9/2014 | Agarwal |
| 9,648,171 B1* | 5/2017 | Eftekhari ............ H04M 3/5232 |
| 2004/0008836 A1 | 1/2004 | Mani |
| 2004/0202306 A1 | 10/2004 | Brotman et al. |
| 2005/0195960 A1 | 9/2005 | Shaffer et al. |
| 2006/0023865 A1 | 2/2006 | Nice et al. |
| 2007/0121824 A1 | 5/2007 | Agapi et al. |
| 2008/0095355 A1 | 4/2008 | Mahalaha et al. |
| 2009/0085873 A1 | 4/2009 | Betts et al. |
| 2009/0224977 A1 | 9/2009 | Bonner et al. |
| 2010/0033303 A1 | 2/2010 | Dugan et al. |
| 2010/0316213 A1 | 12/2010 | Goel et al. |
| 2011/0040155 A1* | 2/2011 | Guzak .................. G06F 3/0484 600/300 |
| 2011/0201899 A1* | 8/2011 | Price .................. A61B 5/02055 600/300 |
| 2012/0321059 A1 | 12/2012 | O'Connor et al. |
| 2014/0028542 A1* | 1/2014 | Lovitt ...................... G06F 3/017 345/156 |
| 2014/0045458 A1 | 2/2014 | Beilis et al. |
| 2014/0056419 A1 | 2/2014 | Vasquez et al. |
| 2014/0140495 A1* | 5/2014 | Ristock ............... H04M 3/5232 379/265.05 |
| 2014/0173078 A1 | 6/2014 | McCord et al. |
| 2015/0112745 A1 | 4/2015 | Wang et al. |
| 2015/0181038 A1 | 6/2015 | Fox et al. |
| 2015/0271329 A1 | 9/2015 | Deshmukh et al. |
| 2016/0014553 A1 | 1/2016 | Cardinal et al. |
| 2016/0295019 A1 | 10/2016 | O'Connor et al. |
| 2017/0104872 A1* | 4/2017 | Ristock ................. H04M 3/523 |
| 2018/0032682 A1* | 2/2018 | Donalds ................. G16H 10/60 |
| 2019/0228367 A1* | 7/2019 | Longo ............ G06Q 10/063112 |

OTHER PUBLICATIONS

Carter, Jamie, How Mining Human Emotions could become the next Big Thing in Tech, Future Tech, Apr. 20, 2015, 4 pages.

Chronaki, Catherine, Interoperability Standards for remote Health Monitoring, European Heart Rhythm Association, Mar. 22-23, 2010, 30 pages.

Kelly, Vivian, IEEE Standards Association and Continua Health Alliance join forces to develop end-to-end, plug-and-play connectivity for personal connected health, IEEE Standards Association, Nov. 12, 2013, 3 pages.

Piniewski, Brigitte, et al., Empowering Healthcare Patients with Smart Technology, IEEE Computer Society, Jul. 2010, 8 pages.

Sun, Feng-Tso, et al., Activity-aware Mental Stress Detection Using Physiological Sensors, Carnegie Mellon University and Nokia Research Center, Date Unknown, 20 pages.

U.S. Appl. No. 14/288,359, filed May 27, 2014, 29 pages.

* cited by examiner

SYSTEM AND METHOD FOR INTELLIGENT TASK MANAGEMENT AND ROUTING BASED ON PHYSIOLOGICAL SENSOR INPUT DATA

CROSS-REFERENCE TO RELATED APPLICATION

The present application is related to U.S. patent application Ser. No. 14/882,405, filed Oct. 13, 2015, entitled, "SYSTEM AND METHOD FOR INTELLIGENT TASK MANAGEMENT AND ROUTING BASED ON LOCATION SENSOR INPUT DATA", the content of which is incorporated herein by reference.

BACKGROUND

Systems and methods, such as contact centers, provide for a way for large numbers of tasks, such as interactions, to be assigned to multiple agents for completion. It is generally beneficial for these systems and methods to automate the routing and management of these tasks, intelligently utilize the capabilities of the agents, make efficient use of services and resources, and provide consistent approaches to handling various types of tasks.

SUMMARY

According to certain aspects of the present invention, an example of a system is shown for routing tasks to multiple agents, where the system has one or more servers, at least one server having at least one processor for executing stored instructions to perform operations to receive real-time sensor data for multiple agents, store the real-time sensor data in association with a corresponding agent, and receive tasks and, for each task, create a task object representing the task and a content of the task, and place the task object in an input buffer. For each task object in the input buffer, the system also operates to utilize the real-time sensor data to identify one or more of the multiple agents as suitable for assignment to the task, apply a pre-defined routing strategy to the task object in the input buffer to further select one of the one or more of the multiple agents identified as suitable for assignment of the task object based on sensor data, and route the task object to the selected agent. In some examples, the server is configured to assign the task object to the selected agent by moving the task object from the input buffer to a workbin corresponding to the selected agent.

In some examples, the server also operates to analyze the real-time physiological sensor data for each of the multiple agents to determine an emotional state for each agent by predicting the emotional state for each agent if the task is assigned to the agent and utilize the predicted emotional state for each agent in order to identify one or more of the multiple agents as suitable for assignment to the task. In some examples, the server operates to route task objects from the input buffer to one of the multiple agents by also utilizing statistical data representing agent performance or workforce management data representing at least one of agent skills, history and availability along with real-time physiological sensor data in applying the pre-defined routing strategy to each task object to select one of the multiple agents for assignment of the task object. In some examples, the server also operates to route task objects from the input buffer to one of the multiple agents by applying the pre-defined routing strategy to multiple task objects to improve selection of agents for the multiple task objects.

In one refinement, an example of the system further operates to receive a registration request through a network for a physiological sensor device associated with an agent and associate the sensor device with the agent. This refinement also operates to receive sensor data through the network from the sensor device and store the received sensor data in a sensor data server in association with the agent.

In another refinement, an example of the system includes at least one agent desktop associated with one of the multiple agents, the agent desktop operates to discover physiological sensor devices linked to the agent desktop and register each discovered sensor device in association with the associated agent. The agent desktop also operates to receive physiological sensor data from each registered sensor device and send the received physiological sensor data to a sensor data server, where the sensor data server operates to receive and store the received physiological sensor data in association with the associated agent. In still another example of a refinement of the system, the system operates to normalize the physiological sensor data received for an agent on the basis of the agent's physiological baseline.

According to other aspects of the present invention, an example of a system is shown for routing tasks to multiple agents, where the system has one or more servers, at least one server having at least one processor for executing stored instructions to perform operations to receive real-time location sensor data relating to multiple agents and store the real-time location sensor data in association with a corresponding agent. The system also operates to receive tasks having an associated location and, for each task, create a task object representing the task and a content of the task including the associated location, and place the task object in an input buffer. The system further functions to route task objects from the input buffer to one of the multiple agents by operating to analyze the real-time location sensor data for each of the multiple agents to determine a relative location for each agent relative to a location associated with the task object, utilize the relative location for each agent to identify one or more of the multiple agents as suitable for assignment to the task, apply a pre-defined routing strategy to each task object in the input buffer to further select one of the multiple agents identified as suitable for assignment of the task object, and assign the task object to the selected agent.

In one refinement, an example of the system further operates to receive a registration request through a network for a locational sensor device associated with an agent and associate the locational sensor device with the agent. This refinement also operates to receive locational sensor data through the network from the locational sensor device and store the received locational sensor data in a sensor data server in association with the agent.

In another refinement, an example of the system includes at least one agent desktop associated with one of the multiple agents, the agent desktop operates to discover a locational sensor device linked to the agent desktop and register the discovered locational sensor device in association with the associated agent. The agent desktop also operates to receive locational sensor data from the registered locational sensor device and send the received locational sensor data to a sensor data server, where the sensor data server operates to receive and store the received locational sensor data in association with the associated agent.

Related methods and computer readable media are also described herein.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Further, though the detailed description below generally references a contact center for processing interactions, certain aspects of the present approach may be applied to a variety of contexts involving the routing and management of a large number of tasks to multiple agents or persons. For example, certain aspects of the present examples may be applied to managing and assigning the tasks involved in code development, building or manufacturing projects, as well as the processing of orders, documents or shipping. Other aspects of these examples may be applicable to corporate email systems. These contexts are generally characterized by large-scale, complex operations involving a large number of tasks that are to be performed by a large group of agents or persons. The following examples may provide for improved routing and management of tasks in such contexts.

Figure 1:
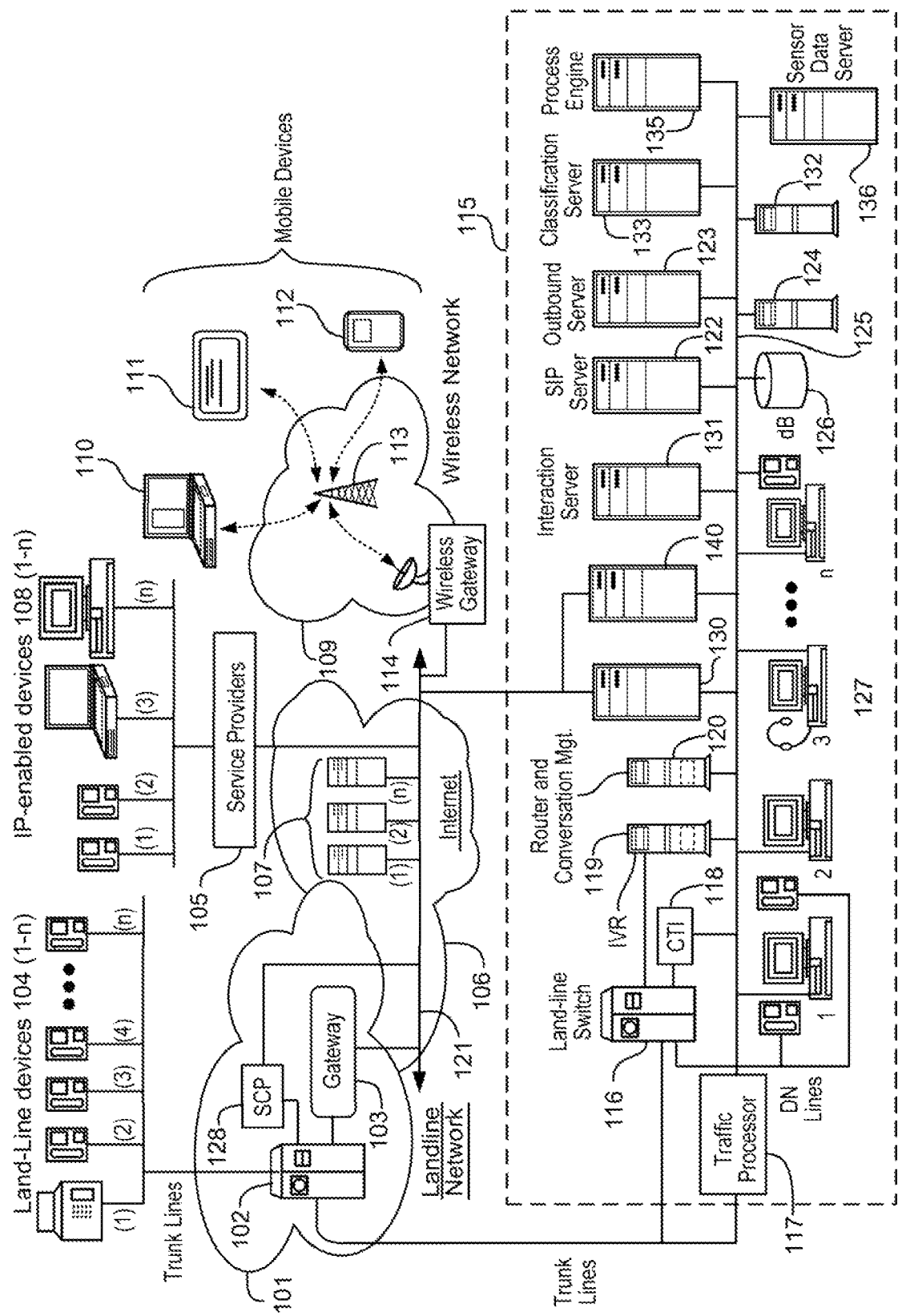
FIG. 1 is a schematic diagram depicting an example of a contact center system.

FIG. 1 is a block diagram illustrating a contact center 115 and a plurality of networks with interconnections where customers may interact with agents at the contact center. Contact center 115 may be hosted by an enterprise and the enterprise may employ more than one contact center. Customers and agents may interact with contact center 115 through communication appliances such as land-line devices, e.g., telephones and facsimile machines 104 (1-$n$), IP-enabled devices 108 (1-$n$), e.g., laptop or desktop computer and IP-enabled phones, through mobile devices 110, 111 or 112, e.g., mobile phones, smart phones, personal digital assistants, tablets, etc. Interactions may include voice, text interaction, email, messaging services chat, facsimiles, mailed letters, and so on.

In one example of a contact center 115, interactions through land-line devices 104 may connect over trunk lines as shown to a network switch 102. Switch 102 may interact with hardware and software of a Service Control Point (SCP) 128, which may execute intelligent operations to determine to connect an incoming call to different ones of possible contact centers or to route an incoming call and facsimiles to an agent in a contact center or to an agent operating as a remote agent outside a contact center premises. Incoming calls and facsimiles in some circumstances may also be routed through a gateway 103 into the Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line device 104 connecting to switch 102 may be routed to contact center 115 via trunk lines as shown to either a land-line switch 116 in contact center 115 or to a Traffic Processor 117. A contact center 115 may operate with the land-line switch or the traffic processor, but in some circumstances may employ both incoming paths. Traffic processor 117 may provide Session Border Control (SBC) functionality, may operate as a Media Gateway, or as a Softswitch. In some implementations, a server may be provided to handle rich media interactions, such as those based on video, or social media interfaces.

Interactions through IP-enabled devices 108 (1-$n$) may occur through the Internet network via backbone 121, enabled by a variety of service providers 105 which operate to provide Internet service for such devices. Devices 102(1) and 102(2) may be IP-enabled telephones, operating under a protocol such as Session Initiation protocol (SIP). Appliance 108(3) is illustrated as a lap-top computer, which may be enabled by software for voice communication over packet networks such as the Internet, and may also interact in many other ways, depending on installed and operable software, such as Skype™ or other VoIP solutions based on technologies such as WebRTC. Similarly appliance 108($n$)

illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may include a great variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which users may leverage in interaction with a contact center such as contact center 115.

Another arrangement to interact with contact centers is through mobile devices, illustrated in FIG. 1 by devices 110, 111 and 112. Such mobile devices may include, but are not limited to laptop computers, tablet devices and smart telephones. Such devices are not limited by a land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur in various ways, e.g., through Wi-Fi and/or individual ones of cell towers 113 associated with base stations having gateways such as gateway 114 illustrated, the gateways connected to Internet backbone 121, etc.

In some circumstances mobile devices such as devices 110, 111 and 112 may connect to supplemental equipment operable in a moving vehicle. For example, cellular smartphones may be enabled for near-field communication such as Bluetooth™, and may be paired with equipment in an automobile, which may in turn connect to the Internet network through satellite equipment and services, such as On-Star™. Wireless communication may be provided as well in aircraft, which may provide an on-board base station, which may connect wirelessly to the Internet through either a series of ground stations over which an aircraft may pass in flight, or through one or more satellites.

Contact Center

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The (TI server 118 can be implemented with a GENESYS TELECOMMUNATION SYSTEMS, INC. T-server. Calls may be buffered in any one of a variety of ways before connection to an agent, either locally-based or remote from the contact center, depending on circumstances.

Incoming land-line calls to switch 116 may also be connected to the IVR server 119, which may serve to ascertain purpose of the caller and other information useful in further routing of the call to final connection, if further routing is needed. A router and conversation manager server 120 may be leveraged for routing intelligence, of which there may be a great variety, and for association of the instant call with previous calls or future calls that might be made. The router and conversation manager server 120 can be mapped to a GENESYS TELECOMMINATION SYSTEMS, INC. orchestration routing server, a universal routing server (URS) and conversation manager.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet. Voice over IP (VoIP) calls typically arrive at a Session Border Controller (SBC) or VoIP Gateway 140, which controls signaling and media streams for VoIP call sessions as well as network security. For example, incoming VoIP calls may be directed to SIP Server 122 for routing and other processing. Text-based communication arrive in the Contact Center at an eServices Connector 130. eServices Connector 130 may provide protective functions, such as a firewall may provide in other architecture, and may serve to direct incoming text transactions to appropriate service servers. For example, text-based transactions may be directed to an Interaction Server 131, which may manage email, chat sessions, Short Message Service (SMS) transactions, co-browsing sessions, and more. In some implementations, a co-browse server may be provided to manage co-browse sessions.

The Interaction Server 131 may leverage services of other servers in the contact center, and available remotely as well. For example, a Universal Contact Server 132 may store data on contacts, e.g., customers, including customer profiles, preferences and interaction history, history of customer touchpoints and standard responses, and interaction or task records as well as a knowledge base of suggested responses to contacts. The customer profile can include information about a level of service that the customer's interactions are to receive, e.g., for distinguishing a customer segment (gold/silver/bronze) a particular interaction belongs to.

Some implementations may include a knowledge center that manages knowledge articles and Frequently Asked Questions or a conversation manager that manages customer journeys to identify customer segmentation, state of the journey and overall sentiment.

Agent station 127(3) is illustrated as having a connected headset from a computing device, which may execute telephony software to interact with packet switched calls. Agent station 127(n) is illustrated as having an IP-enable telephone connected to LAN 125, through which an agent at that station may connect to packet-switched calls. Every agent station may have a computerized appliance executing software to enable the using agent to transact by voice, email, chat, instant messaging, and any other communication process.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A database dB may be provided to archive interaction data and to provide storage for many of the activities in contact center 115. An outbound server 123 is illustrated and may be used to manage outbound calls in the contact center 115, where calls may be made to aid the authentication process, and answered calls may be connected directly or be buffered to be connected to agents involved in the outbound calls.

As described above, contact center 115, and the architecture and connectivity of the networks through which transaction is accomplished between customers and agents is exemplary, and there are a variety of ways that similar functionality might be attained with somewhat different architecture. The architecture illustrated is exemplary. For example, an architecture for the contact center 115 may enable an agent to request assignment of all current active tasks within the system that are related to a particular customer, such as after an agent has started processing a task for the customer.

Contact centers 115 may operate with a wide variety of media channels for interaction with customers who call in to the centers. Such channels may enable voice interaction in some instances, and in other instances text-based interaction, which may include chat sessions, email exchanges, and text messaging, etc. Some examples of a contact center 115 may also operate to internally generate tasks, such as initiating a contact with a customer for contract renewal, review a contract proposal, or attend training. For example, a conversation manager may track a contract renewal journey and the various tasks associated with this process The contact center 115 and accompanying systems may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Classification Server 133 applies screen rules and models to interactions. In some examples, Classification Server 133 applies screening rules when triggered to do so by a routing strategy active in Routing Server 120. Examples of Classification Server 133 may also apply models to categorize incoming interactions, where it creates and refines its recognition algorithms through training. Screening rules and models may be stored in the database of Contact Server 132. Classification Server 133 may be configured or coupled to a training server configured to produce classification models that recognize categories of interactions. For example, a model may be produced by creating a training object and then scheduling and running a training session, which trains the model based on setting configured for the system through, for example, a knowledge manager server. An example of a knowledge manager includes an administrative user interface for defining and managing standard responses, screening rules and models as well as configuring and scheduling classification training session and managing classification models. In operation, one example of Classification Server 133 may scan incoming e-mails, assigning the e-mail to one or more categories with a percentage confidence rating, and then use the category assignments to pull suggested responses from a standard response library.

Sensor Data Server 136 receives and stores sensor data received from sensor devices associated with agents for use in routing and processing. Multiple sensor devices producing a variety of types of data may be utilized for each agent. Sensor Data Server 136 associates one or more devices with an agent and stores the sensor data stream from each device in association with the agent. Sensor Data Server 136 may also be configured to pre-process the sensor data stream to, for example, interpret the emotional or stress state of an agent from the agent's sensor data or quantify the agent's state. Sensor Data Server 136 may also be configured to normalize an agent's sensor data by comparing it to an agent's baseline state so that evaluations of different agents are comparable to one another. For example, the normalized level of stress may be determined from the difference between the current physiological sensor data and the agent's baseline physiological data. Another example involves self-tuning or calibration by the agent, e.g. the system displays the agent's sensor-derived stress level and the agent responds with their perceived stress level in order to calibrate the physiological data to a stress measure. Server 136 may be configured to develop and store agent baseline data and maintain a historical record of agent sensor data.

Figure 2:
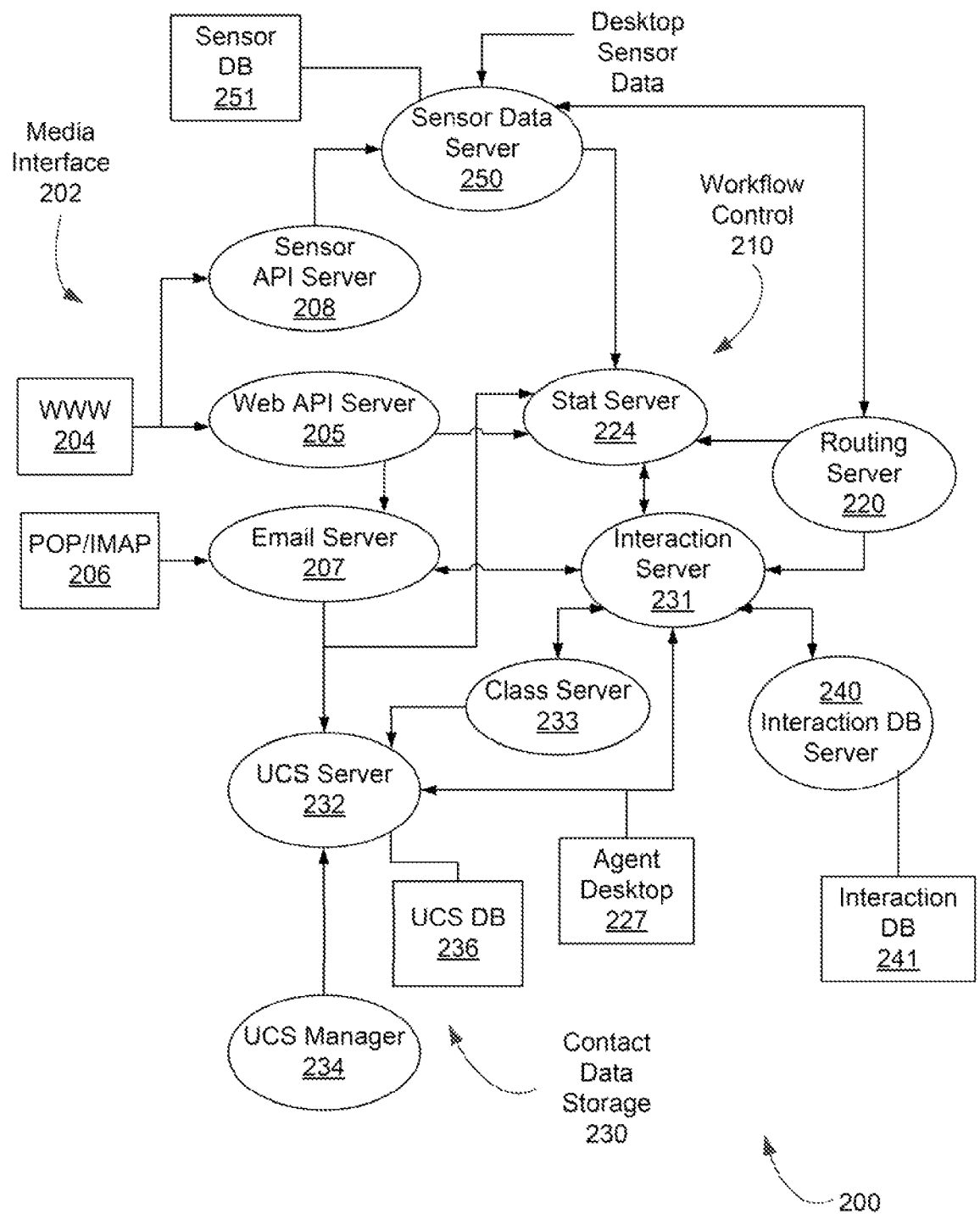
FIG. 2 is a logical diagram illustrating an example of the intermodule communication flow of the contact center system of FIG. 1.

FIG. 2 is a logical diagram of an example of a software architecture 200 of the contact center system of FIG. 1 illustrating an example of communication flow. The servers illustrated in FIG. 2 may correlate to servers in the architecture example in FIG. 1 or may be server processes executing on one or more servers, e.g. multiple server processes residing on one physical server or on a server cluster. Architecture 200, which generally applies to deferrable media contacts, e.g. email, text and web contacts, includes a media interface portion 202 that may interface with customers through a variety of media. In the example shown, Web API Server 205 receives contacts originating via the World Wide Web 204, such as customers using browser clients to contact the contact center. The Web API Server 205 hosts a collections of servlets and objects hosted with a servlet container. The servlet container processes Java Server Pages (JSPs) and forwards interactions to an appropriate media interface (E-mail Server or Chat Server, for example). The servlets may run in the background and communicate with other components, such as Stat Server 224 to obtain real-time statistics for load balancing, for example, or for pacing, i.e. triggering the display of engagement invites. In other examples, the Web API Server 205 may take the form of a Representational State Transfer (REST) service gateway.

Also shown is Email Server 207, which receives email messages from, for example, an enterprise email server via protocols such as POP3 or IMAP. In this example, Email Server 207 interfaces with an enterprise mail server, via POP3 or IMAP, or a WEB API server to receive email interactions and send out replies or other outbound messages. Email Server 207 transmits operational data (such as Interaction ID, date received, originating party, etc.) about each interaction to the Workflow Control components 210 including Interaction Server 231. It also transmits the body of the interaction to Universal Contact Server (UCS) 232 for storage in UCS Database 236. Similarly, chat server, for example, may provide an interface between the Web API Server 205 and Agent Desktop 227 to support chat interactions. The chat server would transmit operation data to Interaction Server 231 and transmit the chat transcript to UCS Server 232.

Media Interface 202 also includes, in this example, Sensor API Server 208, which provides an API that permits sensor devices that are external to the contact center system of FIG. 1 to be registered with the system so that the system may receive and store sensor data from an external sensor device for an agent for whom the device is registered. Registration requests and sensor data are passed to Sensor Data Server 250, where device associations with agents are stored and sensor data from those devices is stored in association with the corresponding agent. Sensor Data Server 250 also receives and stores in Sensor Database 251 the sensor data from devices that are linked to agent desktops. Sensor Data Server 250 provides sensor data to Workflow Control 210 for use in routing processes and decisions as well as other operations. Note that in some examples. Sensor Data Server 250 may also be configured to provide a prediction based on historical data, e.g. expected stress level change when assigning a given pending interaction to a particular agent. In these examples, Routing Server 220 queries Sensor Data Server 250 for a predictive stress level based on current and historical physiological data, e.g. an agent's past physiological response to assignment of a similar task. In some examples, Sensor Data Server 250 may utilize machine learning techniques to predict the stress impact of a task.

UCS Server 232 interfaces with UCS DB 235 to store information relating to contacts. The information stored may include contact information, such as names, address, and phone numbers. It may also include contact history relating to previous interactions with this contact, such as agents with whom the contact communicated, background information, or successful service strategies, as well as standard responses or screening rules. UCS Server 232 may also provide tenant-level statistics to State Server 224 and contact information and history to Agent Desktop 227. Some embodiments may work with knowledge management components, such as Classification Server 233, a training server or a knowledge manager, to apply screening rules and perform content analysis. UCS Manager 234 is an administrative user interface for pruning and archiving UCS data, which may be run manually or on a scheduled basis by a system tenant.

Interaction Server 231 in the Workflow Control components 210 receives operational data from Media Interface components 202 and stores the operational data in Interaction Database 242 through Interaction Database Server 240 while receiving and transmitting information about interactions. Interaction DB 242 also contains Interaction Buffers, such as input and routing buffers, through which interactions pass as they are being processing by Workflow Control components 210. Interaction Server 231 works with Routing Server 220, UCS Server 232 and Classification Server 233, to route interactions in accordance with an interaction workflow, such as a set of processing rules based on business strategy and priorities. A graphical user interface may be provided that enable a tenant to graphically view, build and edit their strategy and subroutines for routing interactions. Interaction Server 231 may also provide an interface for authenticating and activating agents and establish readiness of agents. It may also provide input Buffer statistics to Stat Server 224.

Routing Server 220 works with Interaction Server 231, Stat Server 224 and Sensor Data Server 250 to execute routing strategies. Stat Server 224 accumulates data about places, agents, place/agent groups, Input Buffers, and Tenants and converts the data into statistically useful information. The Stat Server 224 passes data to other components. In particular, Stat Server 224 provides information to Routing Server 220 about agents' capacities in terms of number of interactions, media type of interaction, and similar information for use in driving a routing strategy or routing workflow. As noted above, Sensor Data Server 250 provides sensor data stored in Sensor Database 251 relating to an agent, such as biometric data that may indicate an agent's stress level or real-time location data, for use in routing processes and decisions. In some examples, Routing Server 220 sends a query to Sensor Data Server 250 that requests a stress level of the impact of assigning a task to an agent based on predictive analytics of that impact.

Classification Server 233 applies screening rules and models when triggered to do so by a routing strategy. For example, Classification Server 233 may apply models to categorize incoming tasks for purposes of routing the task. Screening rules and models are stored in UCS DB 236. A training server may be provided to produce the models used by Classification Server 233 and train the system to recognize categories. Producing a model consists of creating a training object, then scheduling and running a training session. Training may be performed by a training server according to settings configured in a knowledge manager. A knowledge manager is a user interface that may be provided for managing standard responses, screening rules, and models. For example, a tenant may utilize a knowledge manager for creating and managing categories, standard responses, screening rules, scheduling classification training sessions, and managing models.

Illustrating an example of handling of an email interaction task, an incoming email at a tenant email server 206 is retrieved by Email Server 207, which sends the body of the email message to UCS Server 232 for storage in UCS DB 236. Email Server 207 sends operational data regarding the email message to Interaction Server 231, which places the operation data representing the email in a Task Object that is placed in an Input Buffer while Interaction Server 231 starts processing the interaction task in according with an interaction task workflow defined for the tenant. Interaction Server 231 submits the interaction task to the strategy associated with the Input Buffer for the tenant. If the strategy indicates that the interaction task is to be routed to an agent, Routing Server 220 works with Stat Server 224 and Sensor Data Server 250 to select an appropriate target agent. Stat Server 224 works with Interaction Server 231 to determine available agent capacities, such as to identify agents with lower assigned workloads. Sensor Data Server 250 provides real-time data pertaining to agents' stress levels or location, for example. The system may also include a Configuration Server that may maintain information regarding the number of tasks currently assigned to an agent's workbin and the capacity limit for an agent. Routing Server 220 selects a target agent and notifies Interaction Server 231, which sends the operational data or Task Object to a workbin 226(1-n) associated with the target Agent Desktop 227. Agent Desktop 227 will automatically retrieve the body of the email from UCS Server 232 for presentation to the target agent so that the agent may handle the interaction task when they access it from the Agent Desktop. Examples of a workbin include a buffer, index, table, list or other data structure in a computer system that contains each task object or a link, pointer or other reference to each task object that is assigned to the agent corresponding to the workbin. One of skill in the art will readily recognize that a workbin may take many forms.

Figure 13:
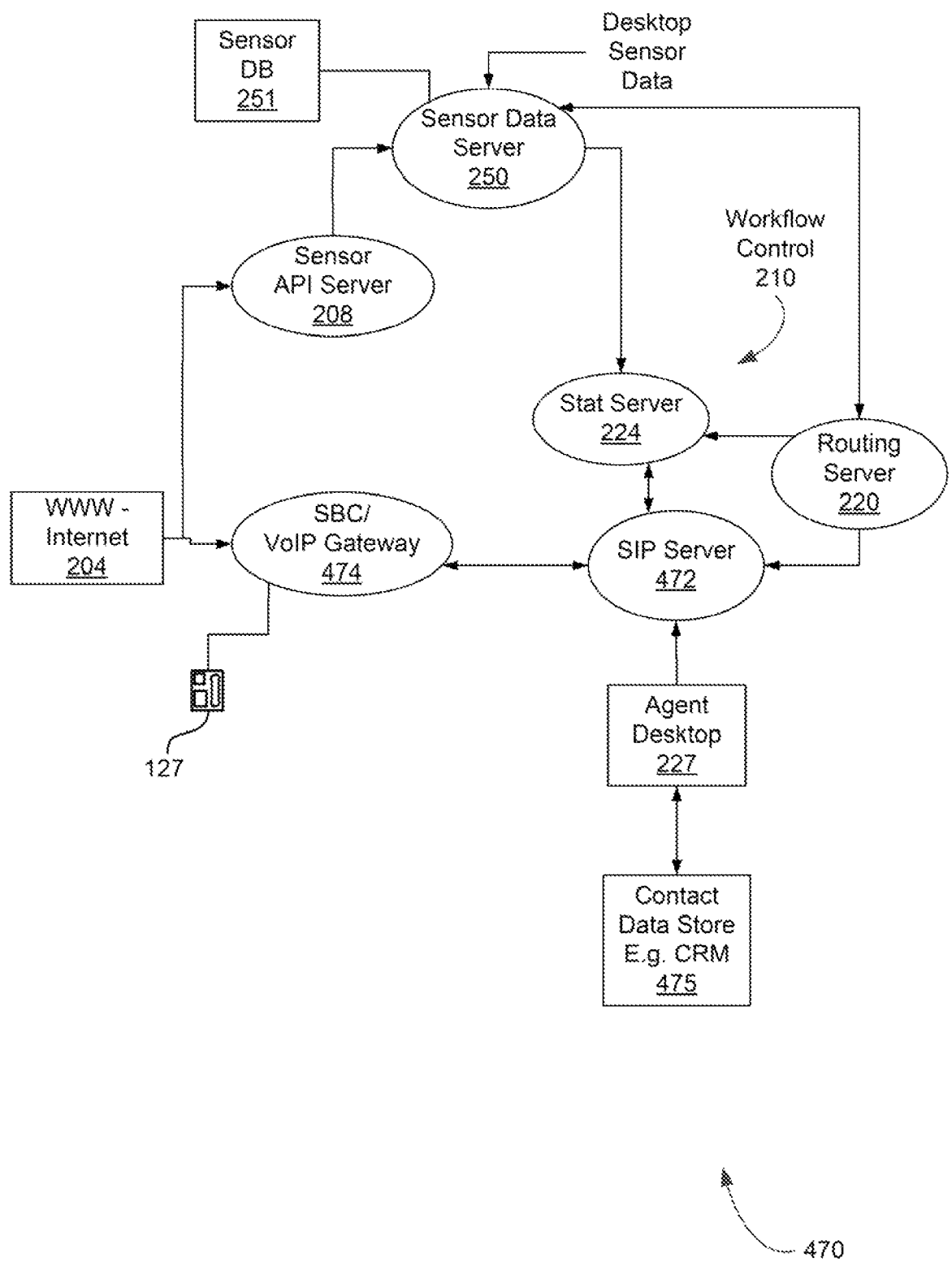
FIG. 13 is a logical diagram illustrating an example of the intermodule communication flow of the contact center system of FIG. 1 for VoIP-based contacts.
Figure 14:
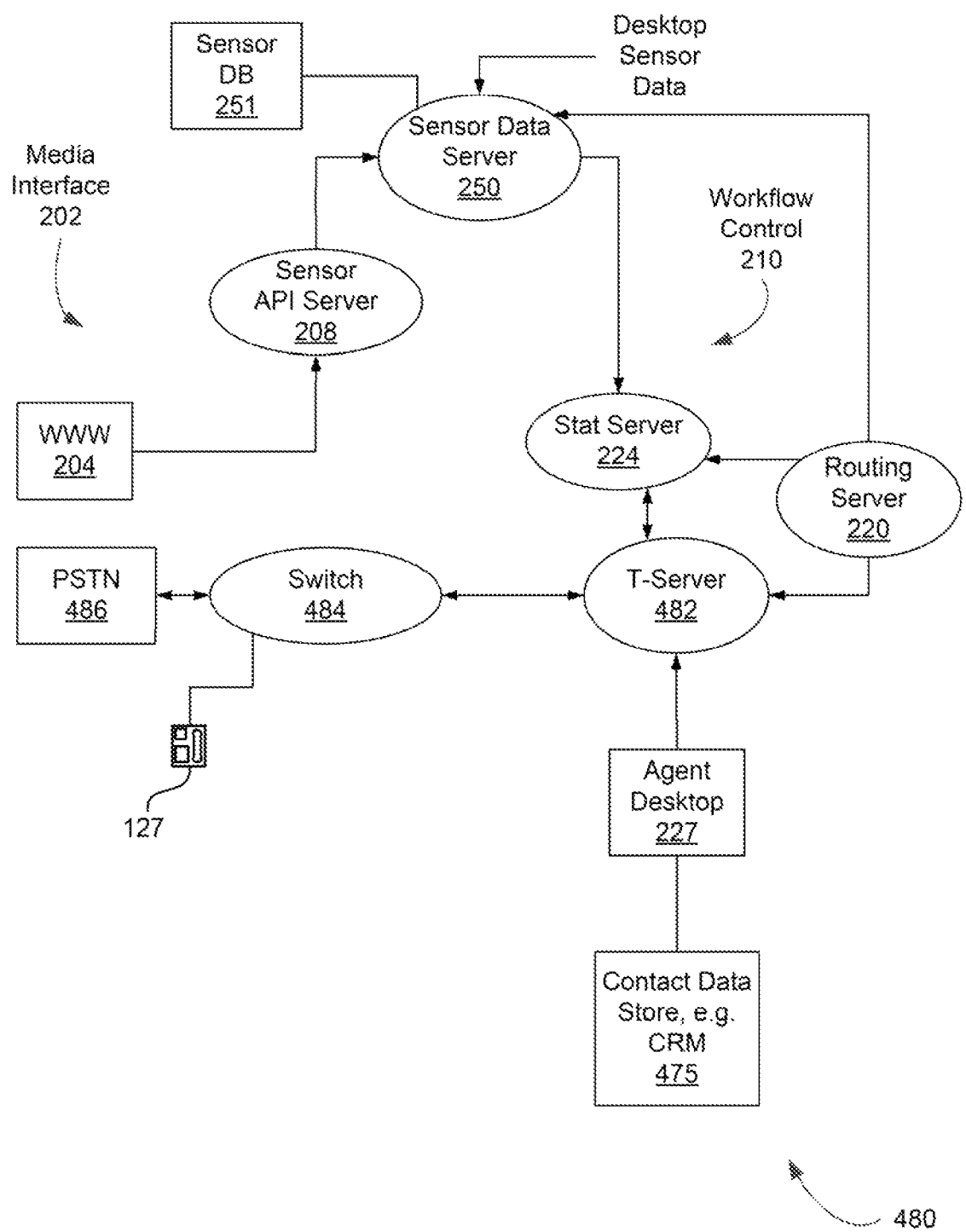
FIG. 14 is a logical diagram illustrating an example of the intermodule communication flow of the contact center system of FIG. 1 for PSTN-based contacts.

Other architectures and media interface servers may be provided for other types of communication in addition to email and web contacts, such as voice call communication from customers to the contact center, which are handled in a similar manner to email and web contacts, but which are generally not deferrable, i.e. they must be routed and handled in real-time while the incoming contact is active. FIG. 13 illustrates an architecture 470 for handling VoIP calls arriving via Web or Internet Interface 204. Arriving VoIP calls go to SBC/VoIP Gateway process 474, such as SBC/VoIP Gateway server 140 in FIG. 1, and are directed to SIP Server process 472, which, in some examples, resides on SIP Server 122 in the architecture of FIG. 1. Similar to the processing described above with respect to Interaction Server 231 in FIG. 2, SIP Server 472 will access Routing Server 220 to select an available agent to receive the incoming contact and direct SBC/VoIP Gateway 474 to redirect the incoming call to the DN device 127 corresponding to the selected agent, for example, rather than a workbin, where, in some examples, an Agent Desktop 227 may correspond or be integrated with DN device 127. Agent Desktop 227 may also have access to Contact Data Store 475, which may be a CRM system, for example, that provides data relevant to the contact to aid the agent. FIG. 14 illustrates an architecture 480 for handling voice calls arriving via PSTN 486. Arriving PSTN calls go to Switch 484, such as Land-line Switch 116 or Traffic Processor 117, and are directed to Telephone Server process 482. Similar to the processing described above with respect to Interaction Server 231 in FIG. 2 and SIP Server 472 in FIG. 13, T Server 482 will access Routing Server 220 to select an available agent to receive the incoming contact and direct Switch 484 to redirect the incoming call to the DN device 127 corresponding to the selected agent, for example, rather than a workbin, where, in some examples. Agent Desktop 227 may correspond or be integrated with DN device 127 and have access to contact data in Contact Data Store 475.

Figure 3:
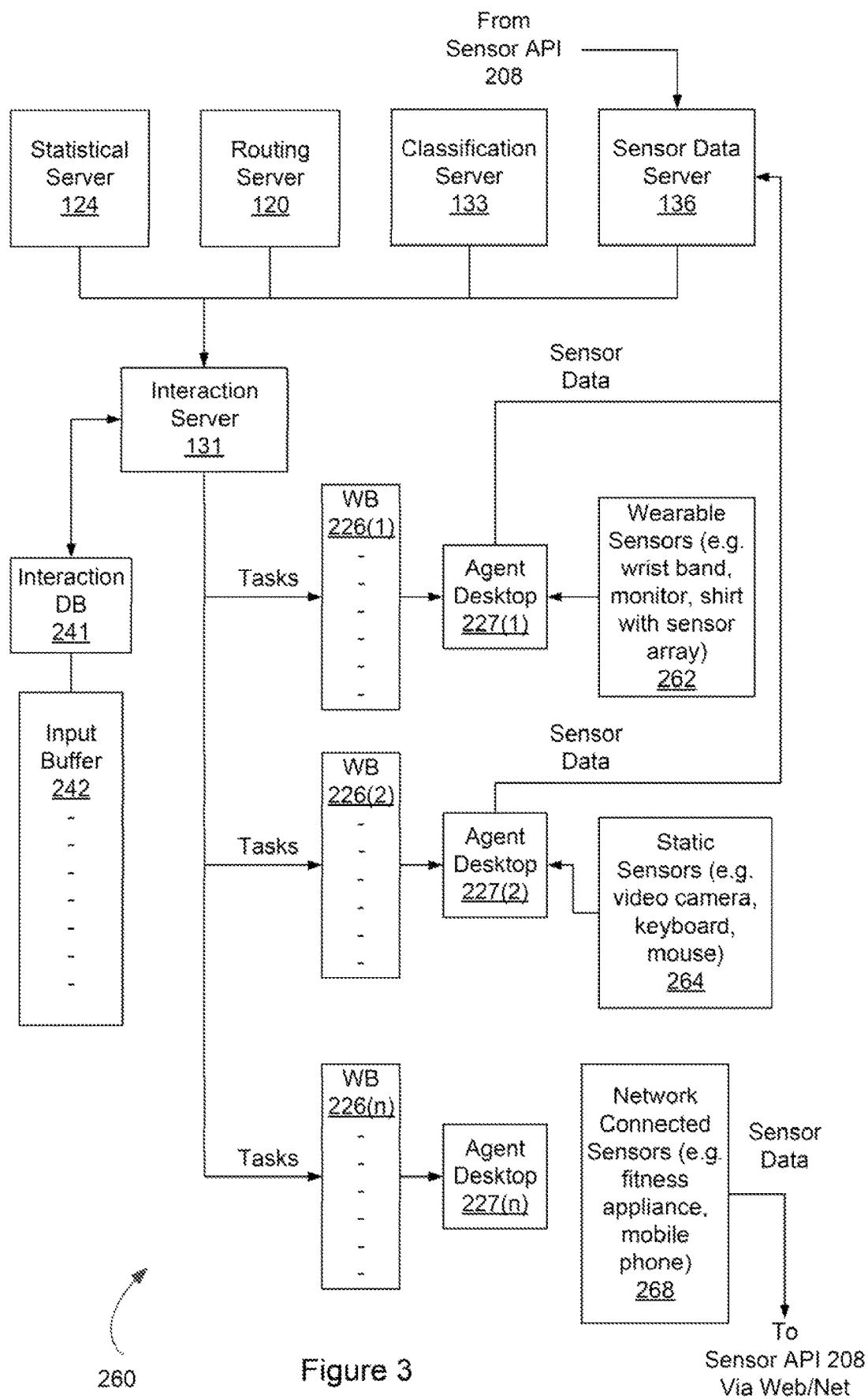
FIG. 3 is a functional block diagram illustrating an example of interaction task routing in the contact center system of FIG. 1.

FIG. 3 is a functional block diagram further illustrates an architecture 260 for routing tasks to multiple agents. In this example, Routing Server 120. Statistical Server 124, Classification Server 133 and Sensor Data Server 136 work with Interaction Server 131 to route tasks stored in Interaction DB 240 in Input Buffer 242, which is a FIFO queue in one example, but may take other forms that are not limited to arrival order. As discussed above, the Routing Server 120 works with Statistical Server 124, Classification Server 133 and Sensor Data Server 136 to execute a routing strategy or workflow for tasks in Input Buffer 242. Based on the routing decision from Routing Server 120, Interaction Server 131 moves a Task Object representing the task to a workbin 226(1-n) corresponding to the agent selected to handle the task. The agent then uses their Agent Desktop 227(1-n) to access the tasks in their workbin 226(1-n). As noted above, the use of a workbin buffer for routing of tasks is optional and may not be applicable to some examples, e.g. voice calls. Also note that while the servers in this example relate to the physical servers illustrated in the example of FIG. 1, the servers may be implemented as processes that reside on the same physical server or various servers in a server cluster.

Sensor Data Server 136 receives real-time sensor data from sensors associated with agents. A variety of different types of sensors may be suitable for use in examples of the present system. The example of FIG. 3 illustrates Wearable Sensors 262, Static Sensors 264 and Network Connected Sensors 268 associated with agents using Agent Desktops 227(1-3). Note that Sensor Data Server 136, in some examples, may also provide predictive stress values that reflect an expected impact of assignment of the task to an agent, e.g. the assignment of a task that is historically stressful for a particular agent or agents in general. In other examples, Sensor Data Server 136 may analyze stress and location data to correlate an agent's stress with a location or a proximity to another agent or supervisor, which may, for example, be utilized in predicting an agent's stress level with respect to a task if assigned.

Examples of Wearable Sensors 262 are devices worn by agents that provide biometric or physiological data relating to the agents' current physical and emotional state and may include sensors that indicate heartrate, respiratory rate, blood pressure, body temperature, voice, muscle activity and skin conductivity. For example, a headset unit may be equipped with one or more such sensors, such as a heartrate monitor and a skin conductivity monitor and use of the headset microphone for voice. In the example of FIG. 3, Wearable Sensors 262 are connected to Agent Desktop 227(1) through wired or wireless communication links. Sensor data received from Wearable Sensors 262 is sent to Sensor Data Server 136 by Agent Desktop 227(1).

Examples of Static Sensors 264 are devices that are installed in or linked to a desktop, laptop or tablet computer utilized by an agent, such as a video camera, microphone, keyboard or mouse that is installed in the computer. Video images, in one example, may be analyzed to recognize stress in an agent's facial expression, body activity or eye movement. Similarly, audio signals, such as voice, may be analyzed to recognize stress from variations in an agent's voice. Even keyboard and mouse activity may be utilized to detect and quantify stress. In the example of FIG. 3, Static Sensors 264 are linked to a desktop, laptop or tablet computer that hosts Agent Desktop 227(2), which may be an application running on the computer. Sensor data received from Static Sensors 264 is sent to Sensor Data Server 136 by Agent Desktop 227(2).

Examples of Network Connected Sensors 268 may include external or third party devices, such as cell phones with sensors and collection application programs or fitness devices. For example, an agent may carry a cell phone with an inertial motion sensor and an application that collects data from the inertial motion sensor and sends it to Sensor Data Server 136. In another example, the agent's cell phone may detect the agent's micro location, e.g. an agent's position in a call center or warehouse at a fine level of granularity, which is sent to Sensor Data Server 136. Other examples of devices that may be utilized or adapted for micro location determination may include a micro location device, an RF location device, a Bluetooth device, an electronic beacon device, a Near Field Communication device, a Quick Response code scanner device, an RFID device, a Wifi device, and a Global Positioning Service (GPS) device. In the example of FIG. 3, Network Connected Sensors 268 have communication links to a public network and transfer sensor data to Sensor Data Server 136 via a web connection through Sensor API 208.

Note that analysis of sensor data may take place in Agent Desktops 227(1-3). Sensor Data Server 136, or partial analysis may take place in either the desktops or the server.

Figure 4:
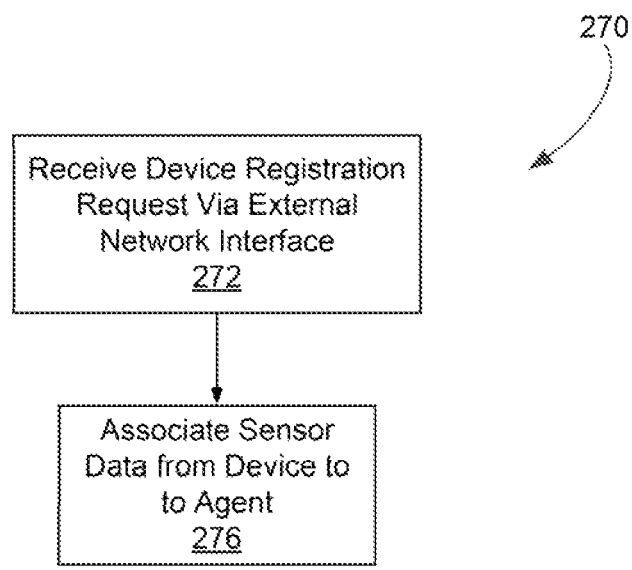
FIG. 4 is a control flow diagram illustrating an example of the control flow for registering an external sensor device in the contact center system of FIG. 1.

In order to utilize sensor data from external sensors, such as Network Connected Sensors 268, the sensors are registered with the system, e.g. Sensor Data Server 136, in a manner that associates the data from that sensor with an agent. FIG. 4 is a control flow diagram illustrating one example of a process 270 for registering external devices. At step 272, in this example, a request is received via Sensor API 208 to register an external device for an agent. The identity of the agent may be obtained in a variety of ways, such as being included in the request or through a validation and registration dialog with Sensor Data Server 136. At step 276, sensor data from the device is associated with the agent, e.g. using a mapping table maintained in Sensor Data Server 136.

Figure 5:
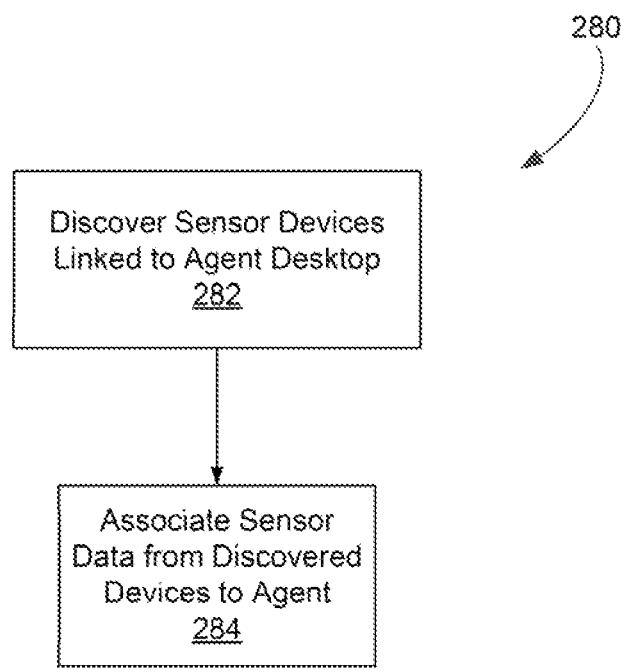
FIG. 5 is a control flow diagram illustrating an example of the control flow for discovering agent sensor devices in the contact center system of FIG. 1.

For devices that are directly linked to Agent Desktops 227(1-3), a discovery protocol may be utilized to identify the sensor devices and associate the data from these devices with an agent. FIG. 5 is a control flow diagram illustrating one example of a process 280 for discovering and associating devices. At step 282, Agent Desktops 227(1-3), which have a known association with an agent, identify the sensor devices that are linked to the desktops as well as the type of data the sensor provides. This information is sent to Sensor Data Server 136, which, at step 284, associates the sensors linked to the agent desktop with the agent associated with the agent desktop. Note that the same desktop equipment may be utilized by different agents at different times, which may require reassignment of sensor data linked to the desktop to be associated with a different agent when that agent comes on duty, for example, or may require rediscovery and re-registration of the sensors worn or used by the different agent.

Figure 6:
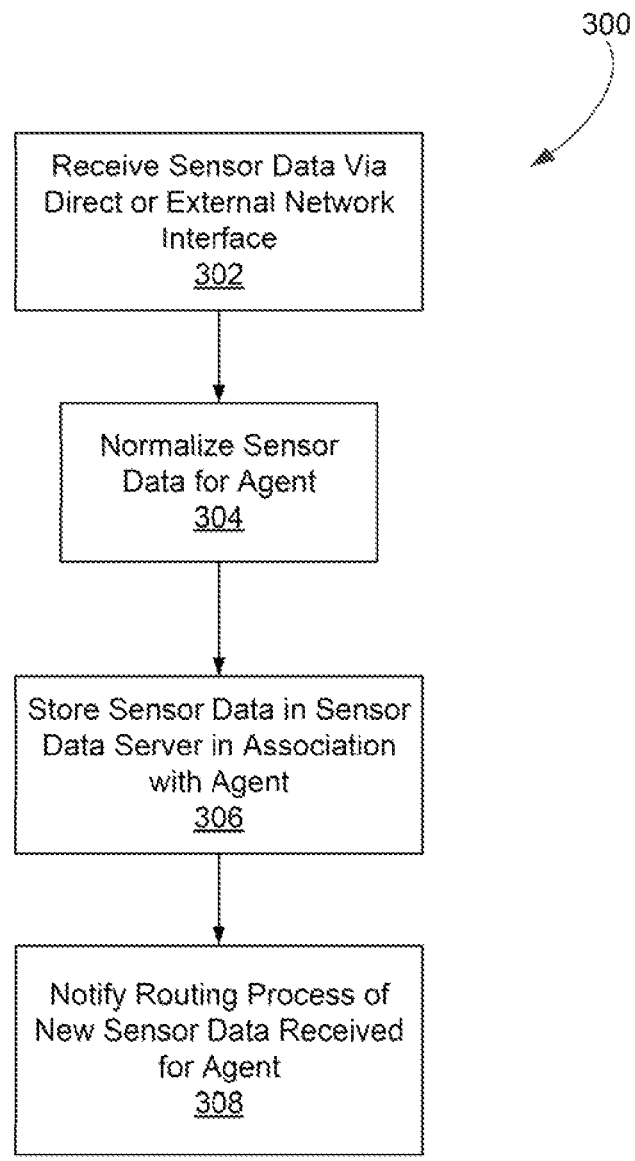
FIG. 6 is a control flow diagram illustrating an example of the control flow for receiving and storing sensor data in the contact center system of FIG. 1.

As real-time sensor data is generated by sensors associated with an agent, that sensor data may be utilized, for example, in task routing determinations that consider the physiological state or micro location of an agent. FIG. 6 is a control flow diagram of one example of a process 300 for receiving and storing streams of sensor data. At step 302, sensor data is received directly from Agent Desktops 227(1) and 227(2), in the example of FIG. 3, or through external network interface API 208. At step 304, the sensor data, in this example, is normalized for the agent, e.g. the sensor data or the analytical data derived from it is adjusted to account for individual variations among agents, e.g. different resting heartrates. At step 306, the sensor data is stored in Sensor Data Server 136 in association with the agent associated with the sensors through, for example, the processes shown in FIGS. 4 and 5. At step 308, in this example, a notification is sent to a routing process, e.g. the process shown in FIG. 7, that new sensor data has been received for an agent. As one of ordinary skill will readily comprehend, a variety of approaches may be taken to processing and utilizing the sensor data, such as accessing the sensor data periodically or on an event driven basis, e.g. when a new task is to be routed.

Figure 7:
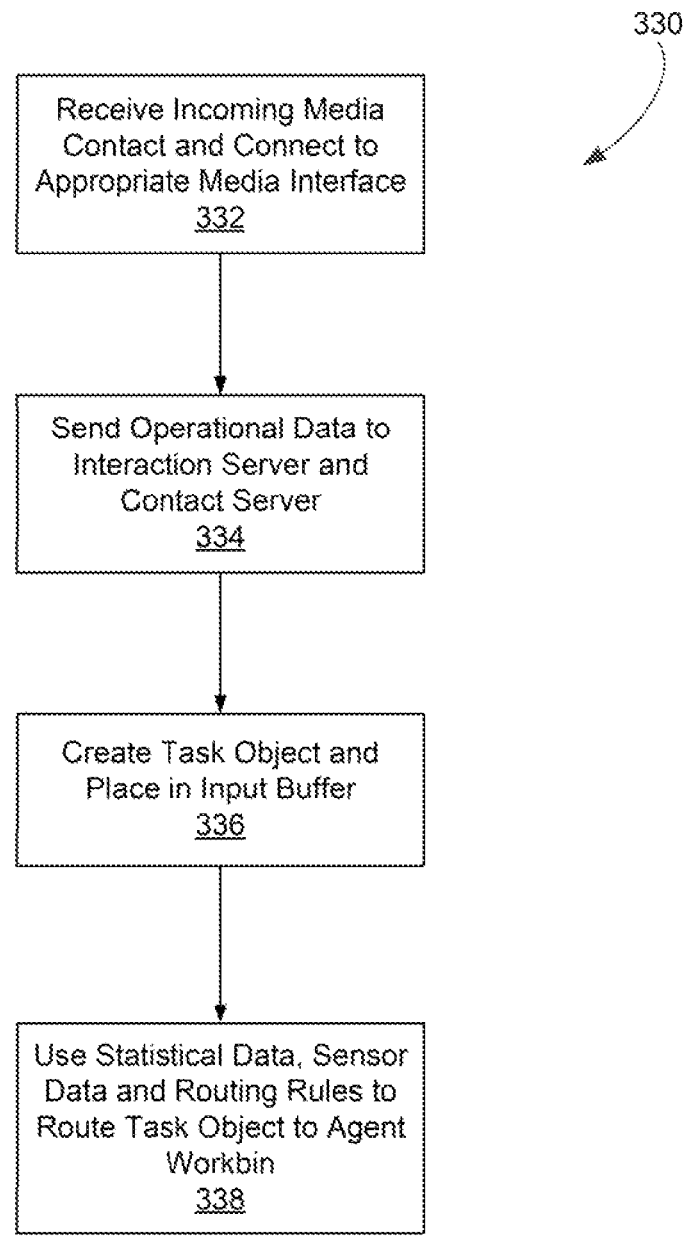
FIG. 7 is a control flow diagram illustrating an example of the control flow for routing an interaction task in the contact center system of FIG. 1.

FIG. 7 is a control flow diagram illustrating one example of a process 330 for routing incoming tasks in the system example illustrated in FIG. 3, wherein Task Objects for incoming interactions or tasks are routed from Input Buffer 242 to Workbins (WBs) 226(1-n) corresponding to Agent Desktops 227(1-n) for handling by agents. At step 332, an incoming media contact is received and connected to an appropriate media interface, e.g. email to an email server, chat to a chat server, etc. At step 334, the media interface that receives the incoming contact at step 332 sends operational data for the incoming contact to the Interaction Server 131 and forwards the body of the contact, e.g. the text, etc., to the Contact Server 132. Some contacts may be handled differently in some examples, e.g. a voice call contact may be sent from a voice media interface to SIP Server 122 in FIG. 1 for processing that does not utilize a workbin buffer. At step 336, a Task Object is created that represents the incoming media contact and the Task Object is placed in the Input Buffer 242. At step 338, statistical data, e.g. workloads, availability, etc., sensor data, and routing rules are used to route the Task Object to a selected agent workbin. Step 338 may also utilize workforce management data to, for example, identify availability of agents, skillsets, etc. Commonly assigned and co-pending U.S. patent application Ser. No. 14/754,530 entitled SYSTEM AND METHOD FOR INTELLIGENT TASK MANAGEMENT AND ROUTING filed Jun. 29, 2015, herein incorporated by reference in its entirety for all purposes, provides additional examples of routing based on statistical and workforce data that may be incorporated into the processing at step 338.

Routing Process 330 may utilize information from Statistics Server 124, Classification Server 133, Sensor Data Server 136 and a Workforce Management (WFM) Server that may provide information regarding a tenant's workforce. For example, a server, such as a configuration server or WFM Server, may provide information regarding staff scheduling and/or the particular skills of individual agents (e.g. language or technical skills), scheduling information (e.g. agent starting, ending and break times), or other information that may be useful to improve the efficacy of routing tasks for the tenant. Data from Statistics Server 124 may include the current work-rate for agents in order to route tasks to agents who are likely to dispatch the task within selected performance criteria for the tenant. Examples of selected performance criteria may include compliance with a Service Level Agreement (SLA) specification regarding time until completion, resolution on first interaction task, and combinations of these and other criteria. Data from the Classification Server 133 may be utilized to establish a priority for a task, such as high priority for real-time tasks, e.g. a live interaction with a customer, and a lower priority for less time sensitive tasks, e.g. an email interaction with a customer, or to identify a standard response for the class of task. Data from a WFM Server may be utilized to identify agents with skills matching the metadata for the Task Object, e.g. language or technical support skills, as well as scheduling information for an agent, such as agents scheduled to be available soon, e.g. beginning their shift or ending their break, and agents who will be unavailable, e.g. ending their shift or beginning their break. Thus, tasks are less likely to be routed to the work-bin of an agent who is unlikely to dispatch the task within required performance parameters at current and historical rates of work for that agent or an agent without appropriate skills for the task or interaction. Data from Sensor Data Server 136 may be utilized to avoid selecting an agent for a task when the agent is experiencing an elevated level of stress or, conversely, to affirmatively select an agent for the task when that agent's stress level is low. In some examples, predictive stress values are utilized to take into consideration impact of assignment of a task to an agent, which is discussed below with respect to FIG. 10.

Figure 8:
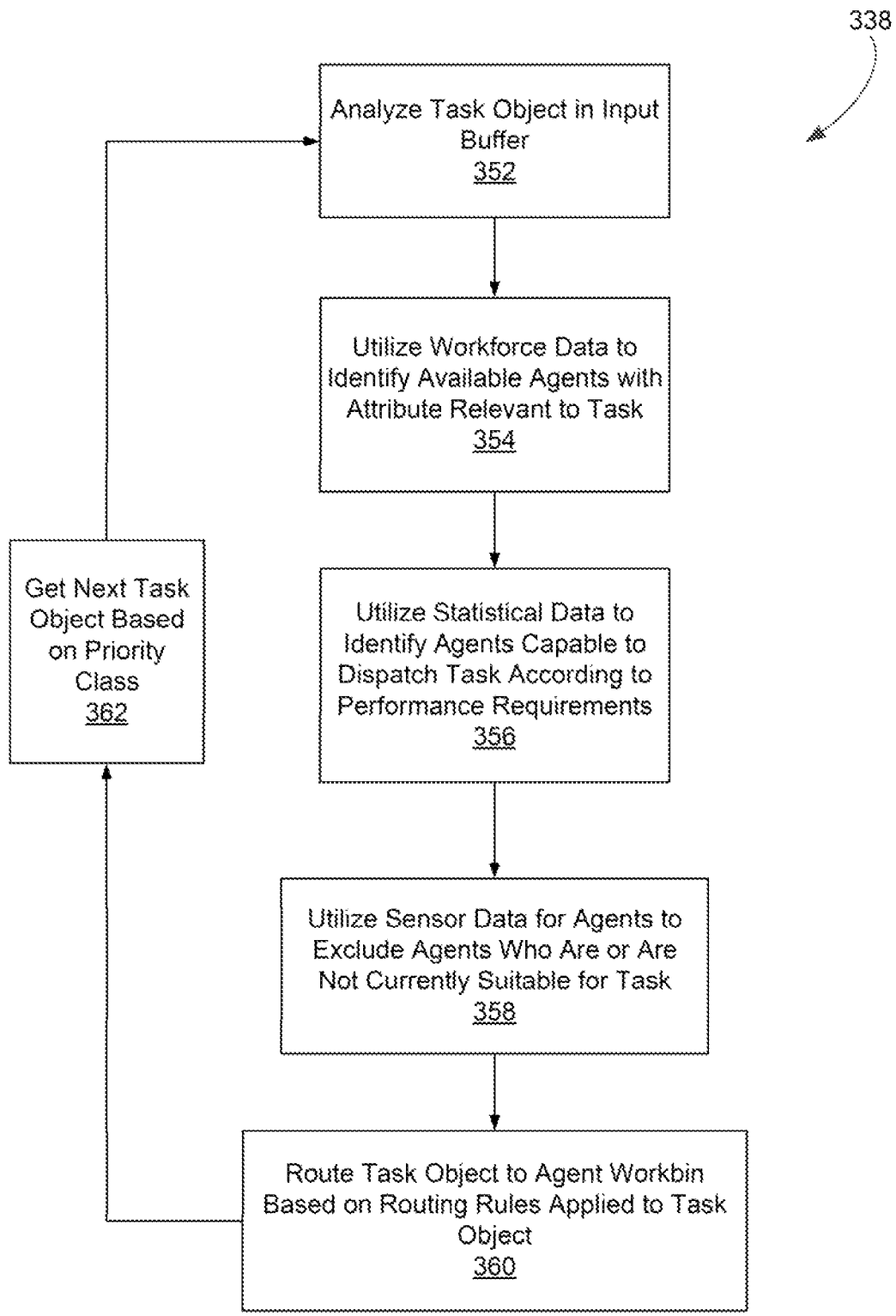
FIG. 8 is a functional block diagram illustrating an example of interaction task routing in a contact center system in accordance with certain aspects of the present invention.

FIG. 8 is a control flow diagram illustrating one example of a process for routing step 338 from FIG. 7. At step 352, a Task Object from Input Buffer 242 is analyzed for routing to a Workbin 226(1-n) to identity characteristics of the task to aid in intelligent routing of the task to an agent. Note that the use of a Workbin is optional and may be utilized in the routing of certain types of tasks, e.g. less time-sensitive tasks, but may not be appropriate for other types of tasks, e.g. voice calls. In this example, at step 354, workforce data from a WFM Server is utilized to identify agents with one or more attributes relevant to the characteristics of the Task Object. For example, if the task is an interaction and the characteristics indicate that the interaction is in a particular language, then agents with skill in that language may be identified. Or, in another example, if the characteristics indicate that the task may involve a particular technical skill, then agents with the technical skill may be identified.

At step 356, statistical data from statistics server 124 is utilized to identify agents whose performance statistics indicate that they will dispatch the task in time to meet performance specifications, standards or guidelines that have been determined for the system. These statistics may include the number of tasks assigned to each agent's workbin, the rate at which individual agents are processing tasks, or the rate at which individual agents have processed a particular type of transaction, such as the type of task indicated by metadata in Task Objects. For example, statistics server 124 may maintain task completion data for agents that may include time duration and quality feedback data. In some examples, performance specifications, standards or guidelines may be defined for a system, a customer, or a group and may be specific to a particular characteristic of a task, e.g. a short duration performance specification is applied to a telephone interaction while a longer duration performance specification is applied to email interactions. If statistical data for an agent indicates that the agent is unlikely to initiate or complete processing of a task within the time indicated for one or more performance specifications, then that agent may be excluded from consideration for routing of the task.

At step 358, sensor data from Sensor Data Server 136 for the agents is utilized to consider the suitability of the agents based on their real-time sensor data. For example, an agent whose sensor data indicates that they have a high current stress level or that they are not located close to the location for the task may be excluded from routing consideration. On the other hand, an agent whose sensor data indicates that they currently have a low level of stress or are in a location advantageous to handling the task may be given higher consideration for selection. In some examples, a prediction of the impact of assignment of the current task may be considered, e.g. Sensor Data Server 136 provides a predicitive value for the level of emotional stress that the agent is likely to experience if the task is assigned to that agent.

At step 360, in this example, the Task Object is routed to an agent Workbin 226(1-n) based on routing rules or workflow strategies applied to the Task Object and its characteristics, which may be defined in metadata for the Task Object. In other examples, e.g. voice, the task is directed to an agent directly, e.g. in real-time, and a workbin buffer is not utilized. The routing rules or workflow strategies may, for example, be defined via a user interface that permits an administrator to define the rules and strategies, which are maintained by routing server 120. Note that, in this example, agents may have been added or removed from consideration for routing at steps 354, 356 and 358. Thus, the results of the routing process at step 360, which may be similar to routing and workflow strategies presently utilized for routing tasks, are enhanced by the consideration of sensor data in the addition or removal of agents from the pool of available targets.

At step 362, the next Task Object in Input Buffer 242 is obtained and control flow branches to step 352 to process the next task using Routing Process 338. Note that, as one of ordinary skill in the art will recognize, more or fewer steps than those shown in the example of FIG. 8 may be utilized in other examples without departing from certain aspects of the invention. For example, multiple tasks may be considered simultaneously by a routing process, where assignment of the tasks to agents is optimized for the multiple tasks, e.g. two tasks are assigned to two agents to achieve a higher overall skill level applied to the tasks. By way of further example, instead of a first task being assigned to a first agent with a very high level of skill, e.g. 5, for the first task and a second task being assigned to a second agent with a lower level of skill, e.g. 2, for the second task, but whose skill level for the first task is almost as high as the first agent, e.g. 4, the first task is assigned to the second agent, e.g. with a level of 4, and the second task is assigned to the first agent, e.g. also with a skill level of 4, so that the overall skill level of the agents assigned to the two tasks is cumulatively higher, e.g. 8 instead of 7. Similarly, multiple tasks and agents may be considered to obtain a lower overall stress level for the agents.

Figure 9:
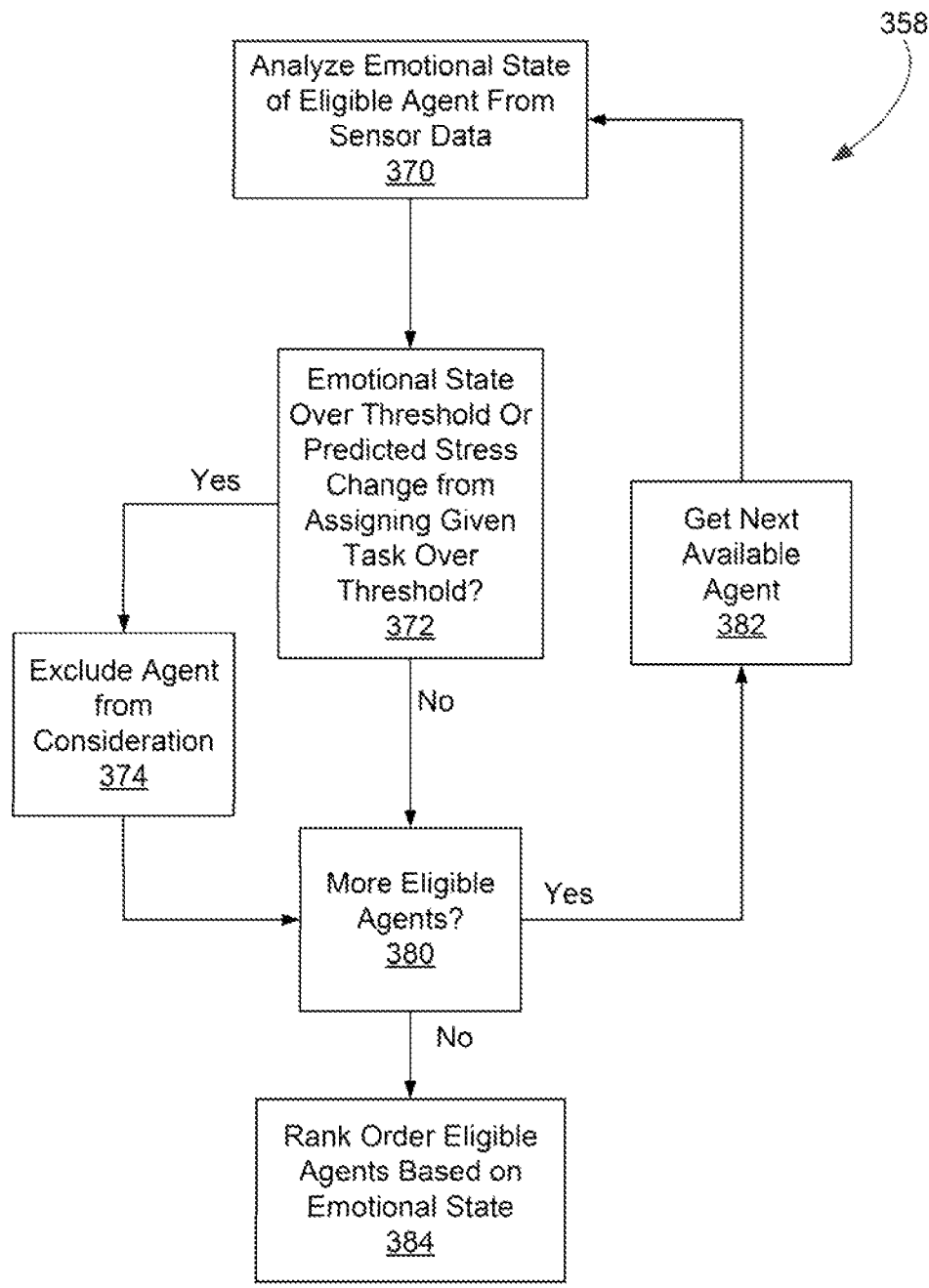
FIG. 9 is a control flow diagram illustrating an example of a process for analysis of emotional state from sensor data.

FIG. 9 is a control flow diagram illustrating an example of the process step 358 of FIG. 8 where the sensor data is physiological and other data that is utilized to quantify emotional state. In this example, at step 370, sensor data from Sensor Data Server 136 is utilized to analyze an agent's current emotional state or stress level. For example, a composite score for stress level may be derived from the agent's blood pressure, heart rate, and voice analysis. At step 372, the agent's stress level is compared to a threshold level, i.e. the composite score is over a preset threshold. If the agent's stress level is over threshold, control branches to step 374, where the agent is excluded from consideration for the task currently under consideration and control continues to step 380. In some examples, step 372 may act upon emotional state information that includes a predictive component, e.g. the emotional state provided by step 370 reflects a prediction of the agent's emotional state if the task is assigned to that agent obtained from Sensor Data Server 250. In other words, an agent whose stress level after being assigned the task under consideration for routing will exceed the threshold will be excluded from consideration. In other words, at step 372, a predicted stress change that may result from assigning the given task to the agent under evaluation is considered to determine whether the impact of assigning the task to the agent will exceed the threshold.

If the agent's stress level is not over threshold at step 372, then control branches to step 380. At step 380, if there are more eligible agents to be considered, control branches to step 382 to get the next available agent's information and control continues to step 370 for analysis of the next agent's sensor data. If there are no more agents to be considered, control branches at step 380 to step 384 where, in this example, the eligible agents are rank ordered based on their emotional state scores. In other examples, each agent is assigned an emotional state score, which may be predictive, and multiple tasks may be considered for assignment in parallel in order to attempt to optimize assignment of the tasks across multiple agents to obtain a lower cumulative stress level for the agents. In another example, multiple tasks and agents are considered and routing attempts to assign the highest available rank ordered agent to each of the multiple tasks.

Figure 10:
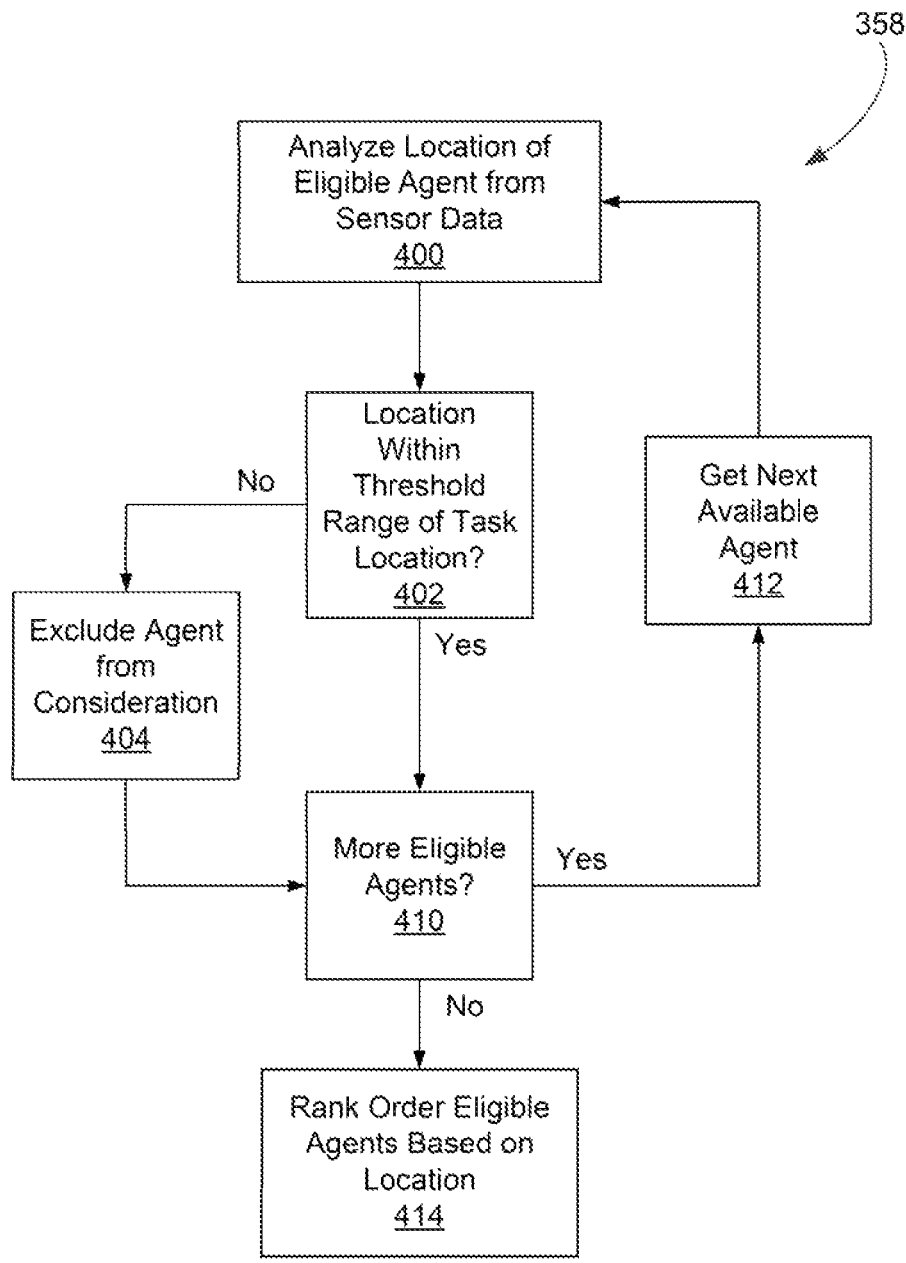
FIG. 10 is a control flow diagram illustrating another example of a process for analysis of agent locations from sensor data.

FIG. 10 is a control flow diagram illustrating another example of the process step 358 of FIG. 8 where the sensor data pertains to location and is used to quantify proximity to a task that has a locational characteristic. In this example, at step 400, sensor data from Sensor Data Server 136 is utilized to analyze an agent's current location. For example, field support agents have devices that provide their geolocation, e.g. a mobile phone that periodically sends its current location to the Sensor Data Server 136 and the tasks pertain to repairs at particular locations. As another example, agents working in a warehouse have one or more sensors that permit the agents' locations to be determined to a fine level of granularity, e.g. micro location, and the tasks pertain to picking warehouse items that are located in the warehouse.

At step 402, a determination is made as to whether the agent's location data from Sensor Data Server 136 places the agent within a threshold range of the location of the task. If the agent's location is not within the threshold range, control branches to step 404, where the agent is excluded from consideration and control continues to step 410. If the agent's location is within the threshold range, control branches from step 402 to step 410 to determine if there are more eligible agents to consider. If there are, control branches to step 412 to get the next agent and continues to step 400 to analyze the next agent's location with respect to the task. If all the eligible agents have been analyzed, control branches from step 410 to step 414, where the remaining eligible agents are rank ordered based on their proximity to the task. As noted above, multiple tasks and multiple agents may be considered in combination rather than sequentially in order to, for example, assign the highest rank ordered agent to each task under consideration.

Figure 11:
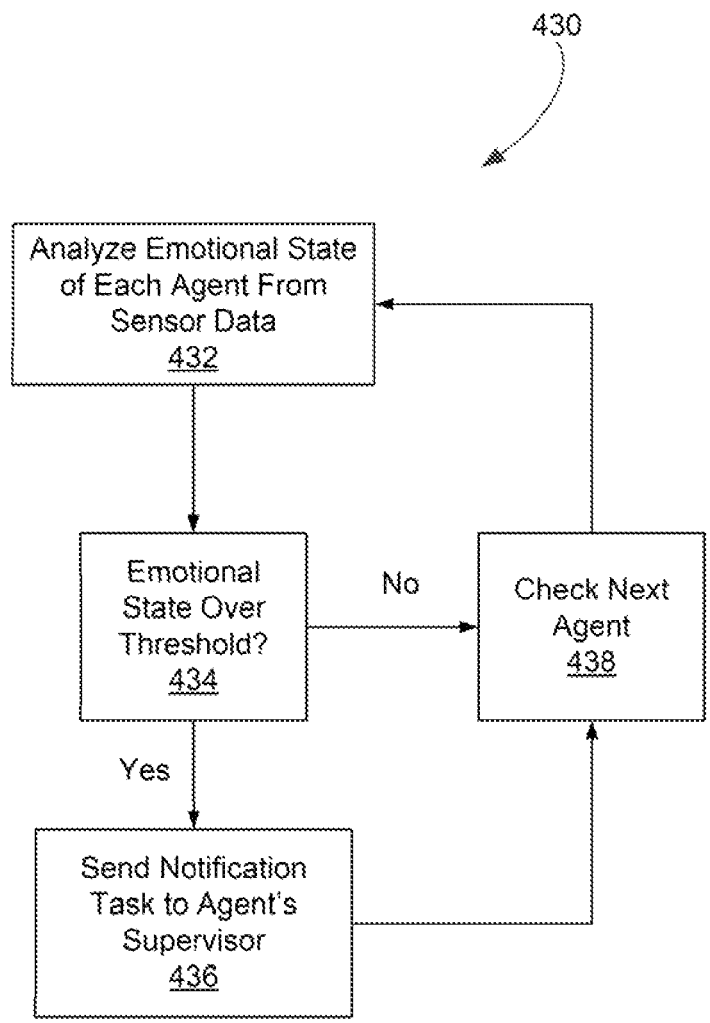
FIG. 11 is a control flow diagram illustrating an example of a process for analyzing emotional state form sensor data to generate a notification.

Other variations on processing based on sensor data are also possible. FIG. 11 is a control flow diagram illustrating one example of a process 430 for notifying an agent's supervisor when an agent is emotionally stressed. At step 432, in this example, sensor data from Sensor Data Server 136 is utilized to analyze an agent's current emotional state or stress level. As in the example above, a composite score for stress level may be derived from the agent's blood pressure, heart rate, and voice analysis. At step 434, the agent's stress level is compared to a threshold level, i.e. the composite score is over a preset threshold. If the agent's stress level is over threshold, control branches to step 436, where a notification task is sent to the agent's supervisor for action. In some examples, other tasks may be generated and multiple thresholds utilized, such as generating an automatic agent break task if an agent's stress level reaches a severe stress threshold. In other examples, automatic silent monitoring by a supervisor may be activated if an agent's stress level reaches a certain threshold and the agent's contact session data is streamed to a supervisor's desktop so the supervisor can listen in and possibly join the session. If the agent's stress level is not over the threshold, control branches to step 438 to check the next agent. Note that multiple tasks and agents may be considered in parallel rather than sequentially as illustrated in the example shown.

Figure 12:
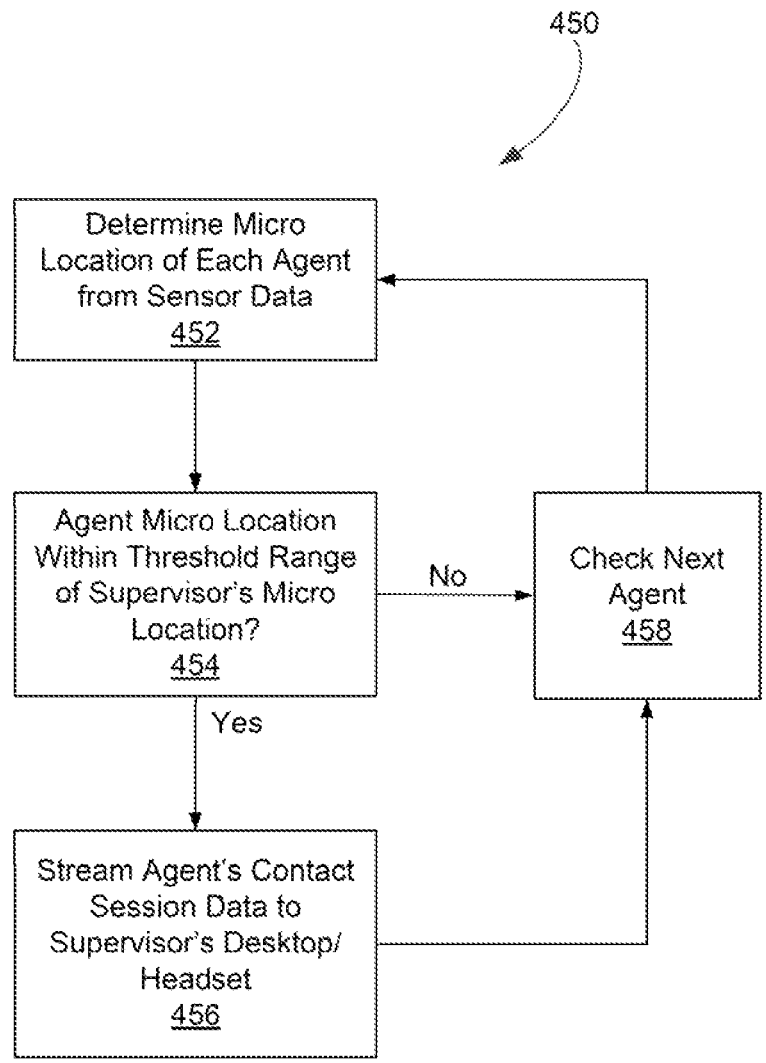
FIG. 12 is a control flow diagram illustrating an example of a process for automatically linking a supervisor to an agent's contact session based on micro location.

FIG. 12 is a control flow diagram illustrating another example of a process 450 where the sensor data pertains to location and is used to stream data from an agent's current session to a supervisor if the supervisor is close by, e.g. standing next to the agent. In this example, at step 452, sensor data from Sensor Data Server 136 is utilized to determine an agent's current location. At step 454, a determination is made as to whether the agent's location data from Sensor Data Server 136 places the agent within a threshold range of the location of the supervisor's location, where the supervisor's location data is also obtained from Sensor Data Server 136. If the agent's location is not within the threshold range of the supervisor, control branches to step 458, where the next agent is checked and control continues to step 452. If the agent's location is within the threshold range, e.g. a threshold distance between supervisor and agent, control branches from step 454 to step 456 to stream the agent's contact session data to the supervisor's desktop or headset, for example. This permits the supervisor to access session data and assist agent's by simply physically approaching them, i.e. in a contact center. In some examples, automatic silent monitoring is activated based on proximity between the supervisor and agent and the contact session data is automatically streamed to the supervisor's desktop or headset for silent monitoring with a capability for the supervisor to join the contact session. Alternatively, an agent using a mobile desktop may be able to activate silent monitoring by approaching within range of the supervisor's desktop.

One of ordinary skill in the art will recognize that more or fewer steps than those shown in the example of FIG. 8 may be utilized in other examples without departing from certain aspects of the invention. For example, the processes of FIGS. 9 and 10 may be utilized together to select or rank agent's for selection on the basis of both stress level and location. By way of another example, a notification to the supervisor in the process of FIG. 11 alerts a supervisor to an agent's stress, and, in response, the supervisor walks to the agent's workstation where the supervisor automatically receives the contact session data for the agent's current session. A variety of approaches may be utilized without departing from the teachings of certain aspects of the present invention.

One of ordinary skill in the art will readily recognize that a variety of rules and strategies may be defined and utilized for the present system and that both the sensor data, analysis and the routing strategies may be configured to be more or less data rich, e.g. multiple streams of sensor data may be combined to perform an analysis of stress level and the routing strategies configured to utilize quantified values for stress level.

Figure 15:
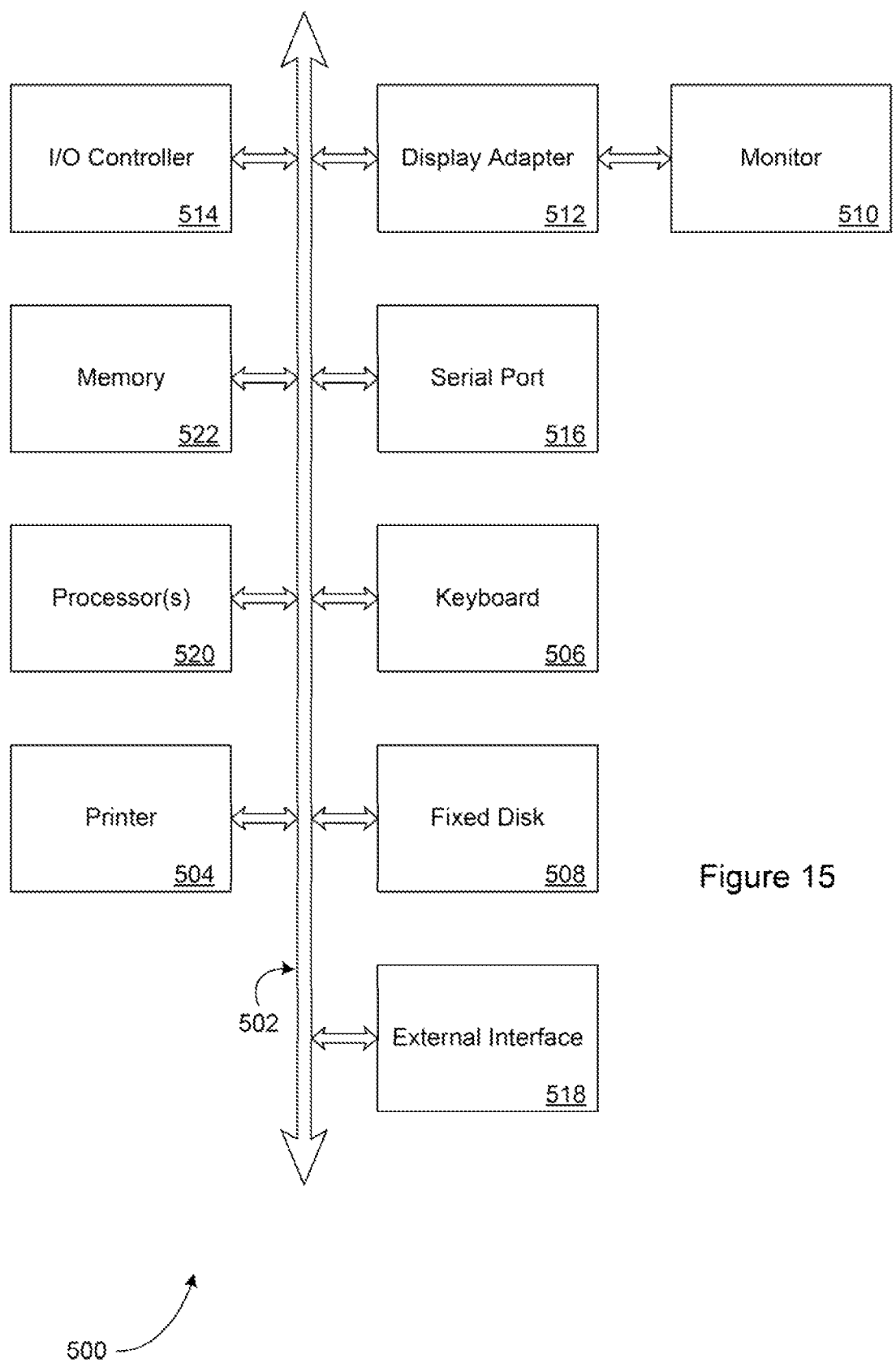
FIG. 15 depicts aspects of elements that may be present in a computer device and/or system configured to implement a method, system and/or process in accordance with some embodiments of the present invention.

FIG. 15 depicts aspects of elements that may be present in a computer device and/or system configured to implement a method, system and/or process in accordance with some embodiments of the present invention.

In accordance with at least one embodiment of the invention, the system, apparatus, methods, processes and/or operations for the systems described above may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system.

As an example, FIG. 15 depicts aspects of elements that may be present in a computer device and/or system 500 configured to implement a method and/or process in accordance with some embodiments of the present invention. The subsystems shown in FIG. 15 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 15 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

We claim:

1. A system for routing tasks to multiple agents, the system comprising:
   one or more servers, each server having at least one processor and a memory storing instructions that, when executed by the at least one processor, cause the processor to:
   receive over a data communications network, real-time physiological sensor data for a particular agent of the multiple agents, the real-time physiological data being gathered automatically by a sensor coupled to the one or more servers;
   store the real-time physiological sensor data in association with the particular agent in a data storage device;
   receive tasks and, for each task, create a task object representing the task and a content of the task, and place the task object in an input buffer;
   determine a current emotional state of the particular agent based on the real-time physiological data;
   determine a current location of the particular agent;
   predict, based on the current location and historical physiological data, an impact on the current emotional state of the particular agent resulting from an assignment of a particular task object to the particular agent, the impact on the current emotional state including an expected stress level change;
   in response to the predicted impact, exclude the particular agent from receiving assignment of the particular task object;
   apply a pre-defined routing strategy to the particular task object in the input buffer to select another one of the multiple agents identified as suitable for assignment of the particular task object; and
   assign the particular task object to the selected agent, wherein the assigning includes electronically routing the task object to a communication device of the selected agent.

2. The system of claim 1, wherein the one or more servers are further configured to perform the following:

receive a request to register the sensor as associated with the particular agent; and register the sensor as associated with the particular agent.

3. The system of claim 2, wherein the system further includes at least one agent desktop associated with the particular agent, the agent desktop being configured to:

discover the sensor linked to the agent desktop; and send a request to register the discovered sensor as associated with the particular agent corresponding to the agent desktop.

4. The system of claim 1, wherein the sensor includes at least one of a heartrate monitor, a respiratory monitor, a body temperature monitor, a skin conductivity monitor, a muscle activity monitor, a video camera, an audio monitor, a keyboard and a mouse.

5. The system of claim 1, wherein the instructions further cause the processor to normalize the physiological sensor data received for the particular agent on the basis of the agent's physiological baseline.

6. The system of claim 1, wherein the instructions further cause the processor to:

generate a notification task in response to the current emotional state of the particular agent exceeding a threshold level.

7. The system of claim 1, wherein the sensor data further includes locational sensor data pertaining to locations of the multiple agents, and the instructions further cause the processor to:

analyze the sensor data for determining the current location of the particular agent.

8. The system of claim 1, wherein the instructions further cause the processor to assign the particular task object to the selected agent by moving the task object from the input buffer to a workbin corresponding to the selected agent.

9. The system of claim 1, wherein the instructions further cause the processor to utilize at least one of statistical data representing agent performance, agent load, and workforce management data representing at least one of agent skills, history and availability along with real-time physiological sensor data of the multiple agents in applying the pre-defined routing strategy to select the another one of the multiple agents for assignment of the particular task object.

10. A method for managing tasks for processing by agents, the tasks being represented by task objects, the method comprising:

receiving, by a processor, over a data communications network, real-time physiological sensor data for a particular agent of the multiple agents, the real-time physiological data being gathered automatically by a sensor coupled to the one or more servers;

storing, by the processor, the real-time physiological sensor data in association with the particular agent in a data storage device;

receiving, by the processor, tasks and, for each task, creating a task object representing the task and a content of the task, and placing the task object in an input buffer;

determining, by the processor, a current emotional state of the particular agent based on the real-time physiological data;

determining, by the processor, a current location of the particular agent;

predicting, by the processor, based on the current location and historical physiological data, an impact on the current emotional state of the particular agent resulting from an assignment of a particular task object to the particular agent, the impact on the current emotional state including an expected stress level change;

in response to the predicted impact, excluding, by the processor, the particular agent from receiving assignment of the particular task object;

applying, by the processor, a pre-defined routing strategy to the particular task object in the input buffer to select another one of the multiple agents identified as suitable for assignment of the particular task object; and assigning the particular task object to the selected agent, wherein the assigning includes electronically routing the task object to a communication device of the selected agent.

11. The method of claim 10, the method further including:

receiving a request to register the sensor as associated with the particular agent; and registering the sensor device as associated with the particular agent.

12. The method of claim 10, the method further including:

discovering the sensor linked to at least one agent desktop associated with the particular agent; and sending a request to register the discovered sensor as associated with the particular agent corresponding to the agent desktop.

13. The method of claim 10, wherein the sensor includes at least one of a heartrate monitor, a respiratory monitor, a body temperature monitor, a skin conductivity monitor, a muscle activity monitor, a video camera, an audio monitor, a keyboard and a mouse.

14. The method of claim 10, the method further including normalizing the physiological sensor data received for the particular agent on the basis of the agent's physiological baseline.

15. The method of claim 10, the method further comprising:

generating a notification task in response to the current emotional state of the particular agent exceeding a threshold level.

16. The method of claim 10, wherein the sensor data further includes locational sensor data pertaining to locations of the multiple agents, and the method further includes:

analyzing the sensor data for determining the current location of the particular agent.

17. The method of claim 10, wherein the assigning the particular task object to the selected agent includes moving the task object from the input buffer to a workbin corresponding to the selected agent.

18. The method of claim 10 further comprising, utilizing at least one of statistical data representing agent performance, agent load, and workforce management data representing at least one of agent skills, history and availability along with real-time physiological sensor data of the multiple agents in applying the pre-defined routing strategy to select the another one of the multiple agents for assignment of the particular task object.

19. A persistent computer readable medium having stored therein instructions configured to cause one or more processor devices to operate to perform a process for managing tasks for processing by agents, the tasks being represented by task objects, and the process comprising:

receiving, over a data communications network, real-time physiological sensor data for a particular agent of the multiple agents, the real-time physiological data being gathered automatically by a sensor coupled to the one or more servers;

storing the real-time physiological sensor data in association with the particular agent in a data storage device;

receiving tasks and, for each task, creating a task object representing the task and a content of the task, and placing the task object in an input buffer;

determining a current emotional state of the particular agent based on the real-time physiological data;

determining a current location of the particular agent;

predicting, based on the current location and historical physiological data, an impact on the current emotional state of the particular agent resulting from an assignment of a particular task object to the particular agent, the impact on the current emotional state including an expected stress level change;

in response to the predicted impact, excluding the particular agent from receiving assignment of the particular task object;

applying a pre-defined routing strategy to the particular task object in the input buffer to select another one of the multiple agents identified as suitable for assignment of the particular task object; and assigning the particular task object to the selected agent, wherein the assigning includes electronically routing the task object to a communication device of the selected agent.

20. The persistent computer readable medium of claim 19, the computer readable medium further including instructions stored therein configured to cause one or more processor devices to operate to further perform:

receiving a request to register the sensor as associated with the particular agent; and registering the sensor as associated with the particular agent.

21. The persistent computer readable medium of claim 20, wherein the registration request is received through a network and the sensor data from the registered sensor is received through the network.

22. The persistent computer readable medium of claim 19, the computer readable medium further including instructions stored therein configured to cause one or more processor devices to operate to further perform:

discovering the sensor linked to at least one agent desktop associated with the particular agent; and sending a request to register the discovered sensor as associated with the particular agent corresponding to the agent desktop.

23. The persistent computer readable medium of claim 19, wherein the sensor devices include at least one of a heartrate monitor, a respiratory monitor, a body temperature monitor, a skin conductivity monitor, a muscle activity monitor, a video camera, an audio monitor, a keyboard and a mouse.

24. The persistent computer readable medium of claim 19, the computer readable medium further including instructions stored therein configured to cause one or more processor devices to operate to further perform normalizing the physiological sensor data received for the particular agent on the basis of the agent's physiological baseline.

25. The persistent computer readable medium of claim 19, the computer readable medium further including instructions stored therein configured to cause one or more processor devices to operate to further perform:

generating a notification task in response to the current emotional state of the particular agent exceeding a threshold level.

26. The persistent computer readable medium of claim 19, wherein the sensor data further includes locational sensor data pertaining to locations of the multiple agents and the computer readable medium further including instructions stored therein configured to cause one or more processor devices to operate to further perform:

analyzing the sensor data for determining the current location of the particular agent.

27. The persistent computer readable medium of claim 19, wherein the instructions configured to cause one or more processor devices to operate to perform assigning of the particular task object to the selected agent includes instructions for moving the task object from the input buffer to a workbin corresponding to the selected agent.

28. The persistent computer readable medium of claim 19, where the instructions configured to cause one or more processor devices to operate to utilize at least one of statistical data representing agent performance, agent load, and workforce management data representing at least one of agent skills, history and availability along with real-time physiological sensor data of the multiple agents in applying the pre-defined routing strategy to select the another one of the multiple agents for assignment of the particular task object.

* * * * *